Feb. 14, 1967  E. S. SMITH  3,304,444
CONTROL DEVICE FOR AN ELECTRICAL SWITCH
Filed Nov. 1, 1963  2 Sheets-Sheet 1

INVENTOR.
EUGENE S. SMITH
BY
ATTORNEY

Feb. 14, 1967 E. S. SMITH 3,304,444
CONTROL DEVICE FOR AN ELECTRICAL SWITCH
Filed Nov. 1, 1963 2 Sheets-Sheet 2

INVENTOR.
EUGENE S. SMITH
BY John Cyril Malloy
ATTORNEY 3,304,444
CONTROL DEVICE FOR AN ELECTRICAL SWITCH
Eugene S. Smith, Fort Myers, Fla.
(4531 Caminita de la Puerta, Tucson, Ariz. 85718)
Filed Nov. 1, 1963, Ser. No. 320,784
10 Claims. (Cl. 307—112)

This invention relates to a control device for a master switch to alternatively permit or interrupt current flow in an electrical circuit or a plurality of circuits and, more particularly, to a control device for electrically closing a master switch of an electrical circuit and mechanically holding it in a closed position to be subsequently released by electrical means.

As is perhaps well known, in industry it is quite common that a plurality of circuits include a common master switch which is maintained in a closed position during operation of electrical apparatus in the circuits. The switch is ordinarily maintained in the closed position by means of a control circuit including a solenoid and an associated movable plunger, the master switch being connected to the plunger and being adapted by spring means to be normally open and closable by movement of the plunger in response to a current flow in the solenoid of the control circuit so that; upon an interruption of the current to the coil, the master switch will spring open. Current must continuously be supplied to the solenoid of the control circuit to maintain the master switch in the closed position, and, consequently, the electrical apparatus in operation. The instant invention provides a mechanical lock to hold a common master switch in a closed position so that continuous current is not required by the coil. In the instant invention only a momentary flow of current need be supplied in the control circuit of sufficient amount to cause a solenoid to move a plunger so as to close the master switch and permit a mechanical lock to hold it in the closed position. Electrically in parallel with the first solenoid, a second solenoid is provided, the secondary solenoid or release solenoid having a movable plunger operably connected to the mechanical lock to release it and permit the master switch to be opened by an included resilient means upon a flow of current in the secondary or release coil. Switch means operable upon movement of the plungers are provided in the control circuit so that both of the solenoids may not be energized at the same time and, also included in the control circuit is an electrical means to momentarily permit current flow in the control circuit such as the means disclosed in my co-pending patent application, Serial Number 305,414, or by a suitable combination of relay coils and contacts.

It is, accordingly, an object of this invention to provide an electrically closed and mechanically locked master switch which does not require continuous current flow to maintain it in a closed position.

It is another object of this invention to provide a control device including a control circuit and means to momentarily permit current flow to a control circuit for a spring-biased switch member to electrically move the switch member and mechanically lock it into position from which it can be released by the electrical means, the electrical means being operative by successive and separate electrical current flows.

It is a general object of this invention to provide a control device for a switch member which is adapted to be simple in construction and relatively free of maintenance costs.

In accordance with these and other objects which will become apparent hereinafter, the instant invention will now be described with reference to the accompanying drawings illustrating a preferred embodiment thereof in which.

Figure 1:
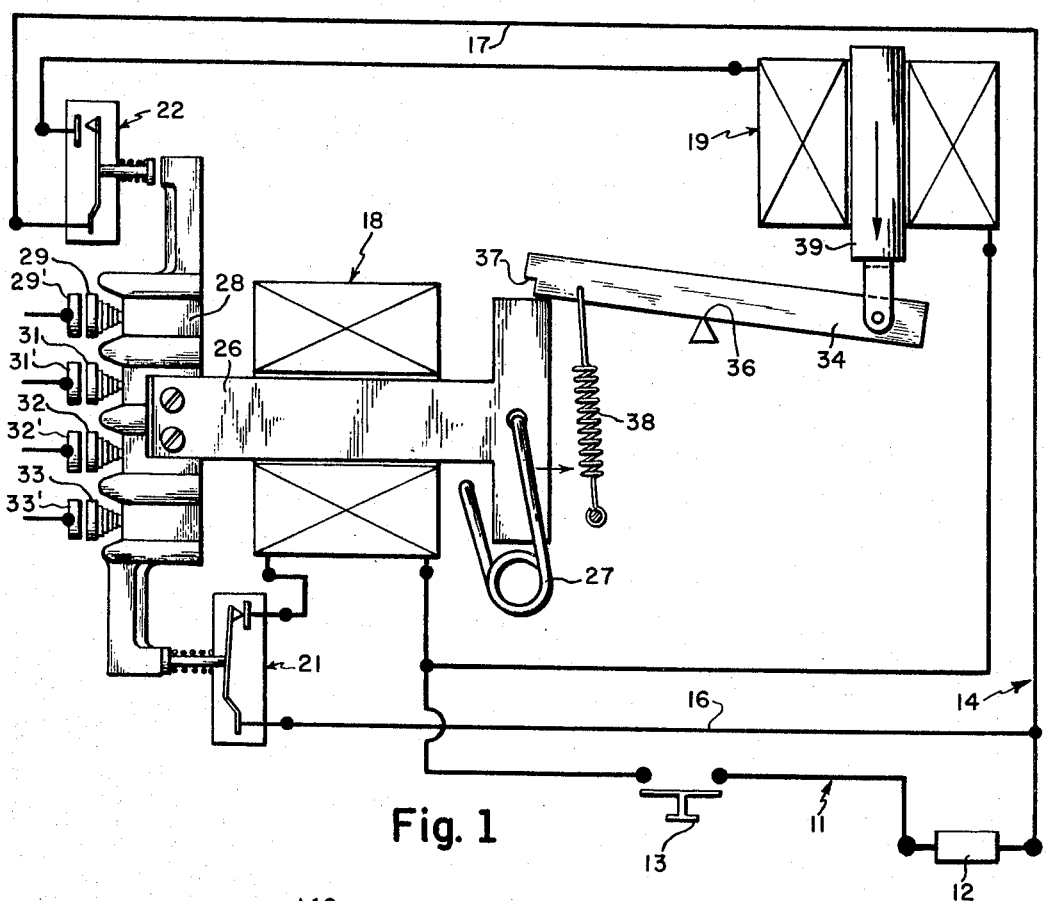
FIG. 1 is a schematic view illustrating the master switch and control device.

Referring more particularly to the drawings, wherein like reference characters designate like or corresponding parts throughout the different views, and referring particularly to FIG. 1, the numeral 11 generally represents a control circuit including in series a source 12, a momentary contact switch 13, or equivalent, and a parallel circuit 14. The parallel circuit includes first and second conductive paths 16 and 17, each path having a tractive electromagnet, with a solenoid and a plunger, and switch in series, the solenoid 18 and the switch 21 being in the first path and the solenoid 19 and the switch 22 being in the second path. Referring to the solenoid 18, it has received therein a plunger or armature 26 adapted to be traveled by the electrical field of the solenoid, when it is energized, from a normally open position, such as that shown and to which it is urged by resilient means 27, to a closed position with the several electrical contactors 29, 31, 32 and 33 on the member 28 in electrical engagement with and permitting current flow through the leads 29′, 31′, 32′ and 33′ in a plurality of electrical circuits. Mechanical locking means 34, including a lever fulcrumed as at 36, is adapted as by the notch 37, for engagement with the end of the plunger 26, to hold the member 28 with the electrical contactors 29, 31, 32 and 33 in engagement with the leads 29′, 31′, 32′ and 33′, respectively. Preferably, the switch 21 of the first conductive path 16 is normally closed and is mechanically linked to the plunger 26 so that movement of the plunger to circuit-closing position, opens switch 21 and prohibits further current flow through the first conductive path. Switch 22 of the second conductive path, which is normally open, is closed upon movement of the plunger 26 to circuit-closing position. The mechanical means 34 maintain the contactors and leads in the closed position; however, upon a next succeeding application of current which may be caused by a momentary closing of the switch 13, a current is caused to flow from the source 12 in the second conductive path 17 to energize the solenoid 19 and move the plunger 39 releasing the mechanical means 34 so that the resilient means 27 acts upon the plunger 26 moving the contactors 29, 31, 32 and 33 away from the leads 29′ etc. This movement of plunger 26 to circuit-opening position, effects closure of switch 21 and opening of switch 22.

From the foregoing explanation, it is seen that the operation and movement of the member 28, which is an arm of the master switch, is as follows. The master switch is closed by bringing together the contactors and the leads 29, 31, 32 and 33, and 29′, 31′, 32′ and 33′, respectively, the contactors being carried by the member 28 upon movement thereof with the plunger 26 of the main solenoid 18. The plunger moves in response to a momentary current flow in the control circuit 14, which current flow is momentarily allowed to flow by manipulation of the momentary contact switch 13 or equivalent. The movement of the plunger 26 trips the mechanical locking means 34 which is adapted, as by a spring means 38, to move into a position locking and holding the contactors and leads in electrical engagement. Current flow through the solenoid 18 of the first conductive path is not required after the plunger 26 has been moved because the mechanical means holds it. The switch 21 is arranged to be opened at the limit of travel of the plunger. In response to the interruption of the current flow the electrical field of the solenoid 18 collapses. The construction and arrangement of parts are such that, simultaneously with the opening of switch 21 switch 22 is closed by either the plunger or the mechanical means, preferably by the movement of the mechanical means 34. The next closing of the momentary contact switch 13 will result in a next momentary current flow through the second conductive path 17 which energizes the solenoid 19 and moves the plunger 39 to release the mechanical means, consequently, permitting the movement of the plunger 26 and member 28 by the resilient means 27.

Figure 2:
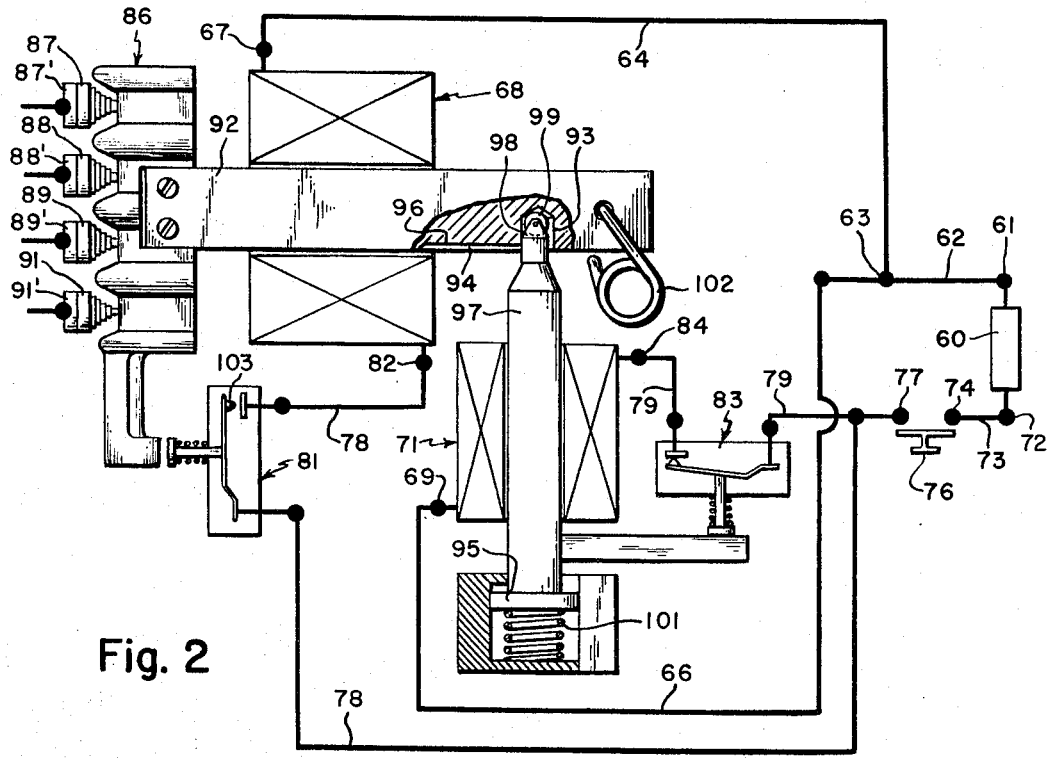
FIG. 2 is a schematic view illustrating an alternative embodiment of the master switch and control device.

With reference to FIG. 2, there is shown a switch control device similar to that of FIG. 1 including a control circuit and a somewhat different mechanical locking means. From the source 60, current may flow from a terminal 61 along a conductive path 62 to a point 63 from which there are two parallel conductors 64 and 66, one of which 64 leads to a terminal 67 of a first solenoid 68 and the other of which 66 leads to a terminal 69 of a release solenoid 71. From the other terminal connection 72 with the source 60 a conductor 73 leads to one terminal 74 of a momentary contact switch 76 or combination of relay contacts and coils to permit a momentary flow of current. From the other terminal 77, of the switch 76, there are first and second conductive paths 78 and 79 respectively. In the first conductive path a normally closed spring-biased switch 81 is in series with the switch energizing first solenoid 68, terminal 82 of which is connected to the conductor 78. In the second conductive path 79 a normally open spring-biased switch 83 is in series with the release solenoid 71, terminal 84 of which is connected to the conductor 79.

As shown, the control device of FIG. 2 is in the mechanically locked position with a contact-carrying member 86 having contactors 87, 88, 89 and 91 in engagement with corresponding leads 87', 88', 89' and 91' of electrical circuits. The contact-carrying member 86 is suitably arranged for movement with the plunger 92 which is movable in response to current flow in the solenoid 68. The plunger 92 is provided with a radial recess 93 intermediate its length and with an axially-extending groove 94 on the surface which leads to the recess. The plunger 97 of the release solenoid 71 is received in the recess 93 when the contact-carrying member 86 is in the position shown in FIG. 2, one end 98 of the plunger 97 being provided with a roller 99 and the other end 95 being spring-biased by a captivated spring means 101 normally urging the roller 99 against the plunger 92 and tending to seat it in the recess 93.

In operation, of the embodiment shown in FIG. 2, upon closing of the switch 76 permitting a momentary current flow, current will energize the release solenoid 71 because, as shown, the switch 83 is closed. The energized release solenoid will move the plunger 97 drawing the end 98 from the recess 93, so that the plunger 92 is freed to move to the right as viewed upon the figure, under the urging of a spring 102 or simply by the force of gravity if the plunger is vertically disposed. The switch 83 will thereby be opened and precluded from closing until the roller 99 is again seated in the recess 93. At the same time switch 81, one terminal of which is carried on the member 103, is closed. Upon the next momentary surge or flow of current caused by another closing of the switch 76, current will flow in conductor 78 across the presently closed switch 81 to energize solenoid 68 and move plunger 92 so that contact-carrying member 86 again carries contactors 87, 88, 89 and 91 into electrical contact with leads 87', 88', 89' and 91'. As the plunger rises spring 101 will urge roller 99 to travel relative to the floor of the groove 96 until it seats in recess 93 locking plunger 92 in the position shown and at the same time closing switch 83 and opening switch 81 by movement of plunger 92.

Figure 4:
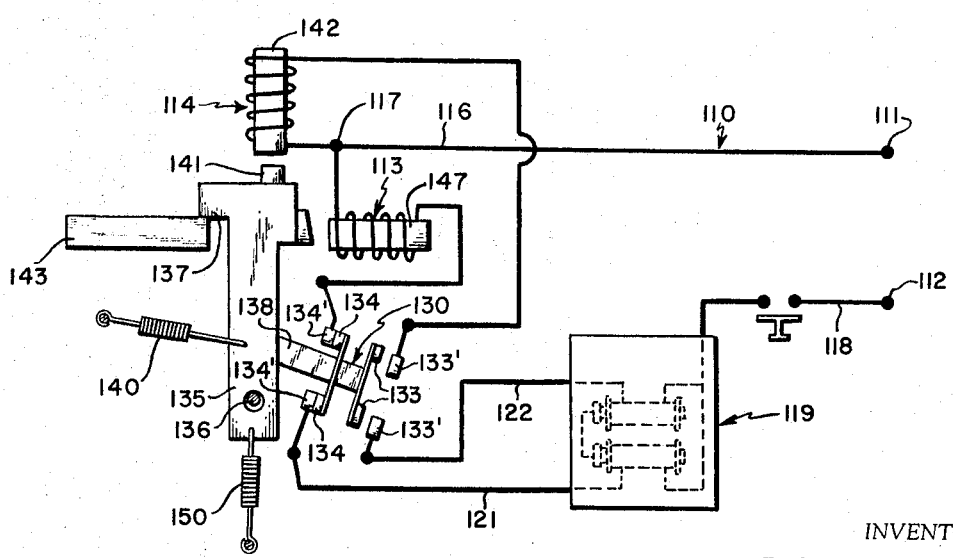
FIG. 4 is a schematic drawing illustrating the control device of FIGURE 3 with the master switch in a locked position.
Figure 3:
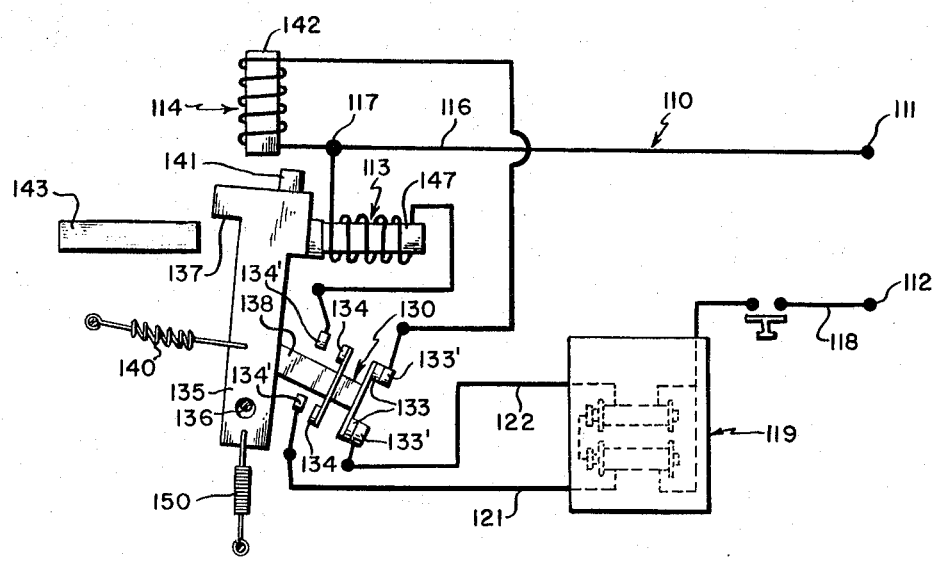
FIG. 3 is a schematic view illustrating an alternative embodiment of the control device in an unlocked position.

With respect to FIGS. 3 and 4 respectively, a control device in a mechanically unlocked position and in a mechanically locked position is shown. A circuit 110 is provided between the terminals 111 and 112 leading from the source, not shown. The said circuit includes first and second solenoids 113 and 114, there being a conductive path 116 from terminal 111 to point 117 which is common to one side of both solenoids, there being a conductive path 118 from the other terminal 112 to a switch means 119. The switch means 119 is adapted to permit only a flow of current therethrough to one of two electrically parallel paths for each closing of the switch means. The switch means 119 is preferably similar to the momentary contact switch of my co-pending patent application; however, it may comprise any equivalent switch means, such as that shown including a switch in series with a pair of relay coils and relay contacts in parallel as shown. From the aforesaid switch means 119, parallel conductors 121 and 122 are provided, conductor 121 connecting a first switch in series with first solenoid 113 and conductor 122 connecting a second switch in series with second solenoid 114, the first and the second conductors being electrically in parallel. A single switch arm 130 carrying leads for bridging the first and second switches may be provided, the arm being movable between a first postion electrically bridging switch terminals 133 and 133' and a second position electrically bridging switch terminals 134 and 134'. A movable member 135 pivotally mounted as at 136 is provided, the said member having a latch 137 at one end thereof and having projecting member 138 carrying the switch arm 130, which arm is adapted to be moved into bridging relation with either switch terminals 133 and 133' or 134 and 134' at any one time.

Referring to FIG. 3, when switch means 119 is closed permitting momentary current flow through switch terminals 133 and 133' along conductor 122 solenoid 114 is energized causing movable member 135 to be pivoted as armature 141 is drawn to core 142 with the result that latch 137 is locked over stationary member 143, as is shown in FIG. 4. Springs 140 and 150 combine to mechanically maintain member 135 in the position shown in FIG. 4 and to maintain the leads of switch arm 130 in electrical engagement with leads 134 and 134'. Upon another separate momentary current flow with closing of the switch means 119, the member 135 is caused to be moved by the energized core 147 of the first solenoid 113, the momentary current flowing through conductor 121 across the bridged leads 134 and 134' to point 117.

It is apparent that each of the three embodiments disclosed and described above include a switch member movable between a first and a second position, which switch member is adapted to be moved to the first position by a first electrical means and mechanically maintained in the first position without the need for continuous operation of the first electrical means until such time as the switch member is released by a second electrical means for movement by a mechanical means to the second position, the said electrical means being in parallel with one another and being adapted to be separately operated by the same source by a limited current flow in a control circuit.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A circuit controller comprising, a switch contact member movable between first and second positions and including biasing means to move the member between the positions, a first normally-closed switch associated with said member and opened by and in response to movement of said member to said second position, a second normally-open switch associated with said member and closed by and in response to movement of said member to said second position, a first solenoid, first means moving said member to the second position in response to energization of said first solenoid, second means releasably engaging said member in the second position when moved thereto, a second solenoid, third means effecting movement of said member to the first position, against the action of said second means, in response to energization of said second solenoid, a control switch, first circuit means connecting said first switch and first solenoid in series, second circuit means electrically in parallel with said first circuit means and connecting said second switch and second solenoid in series, and third circuit means in series with said first and second circuit means and including said control switch to momentarily permit current flow through said switch and through one of either of the first or second circuit means.

2. The controller of claim 1, a main circuit contact, said switch contact member engaging said main circuit contact when in its said second position only, to thereby complete a main circuit.

3. The controller of claim 1, means yieldingly urging said member into said first position, said second means being automatically movable into position latching said member in second position, by and in response to movement of said member to second position, said second solenoid acting to release said latching means from said member.

4. The controller of claim 3, said first means comprising an armature for said first solenoid and connected with said member for translating said member between said first and second positions, in response to energization and de-energization of said first solenoid.

5. The controller of claim 4, said second means comprising a lever having one end adjacent said armature and pivotable from a first position clear of said armature, to a second position with said end in obstructing relation with said member when the latter is in second position, spring means urging said lever into its said second position, said third means comprising an armature for said second solenoid, and connected with said lever remote from said one end thereof.

6. The controller of claim 4, said second means comprising a roller engageable in a recess in the armature of said first solenoid when said member is in its second position only, said third means comprising an armature for said second solenoid, said roller being journaled on one end of the armature of said second solenoid.

7. The controller of claim 6, said armature for said first solenoid having a longitudinally extending groove opening at one end into said recess, said roller riding in said groove as said member moves in translation from said second to first position.

8. The controller of claim 1, said member being pivotable about an axis, said first switch comprising at least a first fixed contact and a second cooperating contact fixed with said member, said second switch comprising at least a third fixed contact and a fourth contact fixed with said member and cooperating with said third contact, said first and third means each comprising respective armatures fixed with said member, said second means comprising a second stationary member releasably engaging said switch contact member when the latter is in second position.

9. For controlling a main switch including a switch member movable between a position permitting current flow and a main circuit in a position interrupting current flow in a main circuit,
   a control device including a control circuit having a source, means to momentarily permit current flow in the control circuit, and a parallel circuit with two conductive paths;
   switch means normally permitting current flow in one conductive path and prohibiting current flow in the other conductive path;
   first electrical means in the one conductive path operable to move the switch member between the position interrupting current flow in the main circuit to the position permitting current flow in the main circuit upon momentary current flow in the control circuit through the one conductive path and to operate the switch means to permit current flow in the other conductive path and prohibit current flow in the one conductive path;
   mechanical locking means operable to hold the switch member in the position permitting current flow upon operation of the first electrical means;
   second electrical means on the frame and electrically in the other conductive path operatively connected to the mechanical means to release the mechanical means, and spring means to move the switch member to a position interrupting current flow in the main circuit.

10. An electrical control device for a movable main switch member of the character described comprising; a source of potential; a monetary contact switch member, and a parallel circuit; means connecting said source, momentary contact switch and parallel circuit in series; said parallel circuit comprising; a first conductive path including a complementary first solenoid and plunger and a normally closed switch; a second conductive path including a second complementary solenoid and plunger and a normally open switch member, said first solenoid being responsive to a momentary current flow therethrough resulting from actuation of the momentary contact switch to actuate the first plunger, to move the main switch member to a closed position, and to close the normally open switch and to open the normally closed switch; mechanical means operably connected to the switch member and movable into holding engagement with the switch member upon movement of the first plunger; said second solenoid being responsive to a momentary current flow therethrough resulting from actuation of the momentary contact switch to actuate the second plunger to release the mechanical means to move the main switch member to an open position and to open the normally open switch and to close the normally closed switch.

References Cited by the Examiner

UNITED STATES PATENTS

| | | | |
|---|---|---|---|
| 1,411,041 | 3/1922 | Lammers | 307—142 X |
| 1,971,199 | 8/1934 | Owens | 200—98 |
| 2,121,974 | 6/1938 | Loehr et al. | 200—98 |
| 3,219,847 | 9/1962 | Morgan | 307—142 X |

ORIS L. RADER, *Primary Examiner.*

T. B. JOIKE, *Assistant Examiner.*